(12) United States Patent
Martin et al.

(10) Patent No.: US 9,848,446 B2
(45) Date of Patent: *Dec. 19, 2017

(54) SYSTEM AND METHODS FOR SYNCHRONIZING EDGE DEVICES ON CHANNELS WITHOUT CARRIER SENSE

(71) Applicants: Astrolink International LLC, Bethesda, MD (US); Dominion Energy Technologies, Inc., Richmond, VA (US)

(72) Inventors: Marcia R. Martin, Denver, CO (US); Andrew Louis Abendschein, Longmont, CO (US); Henrick F. Bernheim, Denver, CO (US)

(73) Assignees: Astrolink International LLC, Bethesda, MD (US); Dominion Energy Technologies, Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/184,642

(22) Filed: Jun. 16, 2016

(65) Prior Publication Data

US 2016/0302238 A1 Oct. 13, 2016

Related U.S. Application Data (63) Continuation of application No. 13/566,481, filed on Aug. 3, 2012, now Pat. No. 9,380,545.
(Continued)

(51) Int. Cl.
*H04W 74/08* (2009.01)
*H04W 56/00* (2009.01)
(Continued)

(52) U.S. Cl.
CPC ........... *H04W 74/0891* (2013.01); *H04L 7/04* (2013.01); *H04L 41/5022* (2013.01);
(Continued)

(58) Field of Classification Search
CPC ..... H02J 3/14; H02J 2003/007; Y04S 20/222; G05B 13/02
See application file for complete search history.

(56) References Cited

U.S. PATENT DOCUMENTS

| 4,200,770 A | 4/1980 | Hellman et al. |
| 4,371,867 A | 2/1983 | Gander |

(Continued)

FOREIGN PATENT DOCUMENTS

| CN | 101770007 A | 7/2010 |
| EP | 0629098 A2 | 12/1994 |

(Continued)

OTHER PUBLICATIONS

Partial Supplementary European Search Report for European Patent Application No. 147543391, dated Oct. 4, 2016, 6 pages.
(Continued)

*Primary Examiner* — Jung Park
(74) *Attorney, Agent, or Firm* — Withrow & Terranova, PLLC (57) ABSTRACT

A system and method are disclosed for synchronizing edge devices on a network, wherein the network has limited bandwidth and does not support a practical carrier sense mechanism. The edge devices transmit, using a slotted protocol, to a server located at a central data aggregation point. The server also controls a Central Transmitter, which sends messages to the edge devices to assign transmission slots and provide timing information to the edge devices to ensure that transmissions sent by devices sharing the same communication channel do not collide.

14 Claims, 5 Drawing Sheets

Related U.S. Application Data (60) Provisional application No. 61/514,726, filed on Aug. 3, 2011.

(51) Int. Cl.
*H04L 7/04* (2006.01)
*H04L 12/24* (2006.01)
*H04L 12/863* (2013.01)
*H04W 28/06* (2009.01)

(52) U.S. Cl.
CPC ....... *H04L 47/6245* (2013.01); *H04W 28/065* (2013.01); *H04W 56/00* (2013.01)

(56) References Cited

U.S. PATENT DOCUMENTS

| | | |
|---|---|---|
| 4,668,934 A | 5/1987 | Shuey |
| 4,918,422 A | 4/1990 | Mak |
| 5,463,624 A | 10/1995 | Hogg et al. |
| 5,812,557 A | 9/1998 | Stewart et al. |
| 6,212,560 B1 | 4/2001 | Fairchild |
| 6,366,062 B2 | 4/2002 | Baretich et al. |
| 6,373,399 B1 | 4/2002 | Johnson et al. |
| 6,650,249 B2 | 11/2003 | Meyer et al. |
| 6,690,655 B1 | 2/2004 | Miner et al. |
| 6,788,702 B1 | 9/2004 | Garcia-Luna-Aceves et al. |
| 6,961,641 B1 | 11/2005 | Forth et al. |
| 7,069,117 B2 | 6/2006 | Wilson et al. |
| 7,076,378 B1 | 7/2006 | Huebner |
| 7,188,003 B2 | 3/2007 | Ransom et al. |
| 7,236,765 B2 | 6/2007 | Bonicatto et al. |
| 7,280,931 B1 | 10/2007 | Kim et al. |
| 7,369,579 B2 | 5/2008 | Logvinov et al. |
| 7,571,028 B2 | 8/2009 | Lapinski et al. |
| 7,701,330 B2 | 4/2010 | Iwamura |
| 7,808,128 B1 | 10/2010 | Weber, Jr. et al. |
| 7,870,600 B2 | 1/2011 | Huotari et al. |
| 7,873,077 B2 | 1/2011 | Downey et al. |
| 7,948,255 B2 | 5/2011 | Shim et al. |
| 8,207,726 B2 | 6/2012 | Vaswani et al. |
| 8,519,832 B2 | 8/2013 | Loporto et al. |
| 8,639,922 B2 | 1/2014 | Phatak |
| 8,639,992 B2 | 1/2014 | Haufe et al. |
| 8,711,995 B2 | 4/2014 | Glende |
| 8,737,555 B2 | 5/2014 | Haug et al. |
| 8,818,742 B2 | 8/2014 | Ansari |
| 8,872,667 B2 | 10/2014 | Bhageria et al. |
| 9,059,842 B2 | 6/2015 | Bernheim et al. |
| 9,287,933 B2 | 3/2016 | Yu |
| 2001/0018561 A1 | 8/2001 | Tanida |
| 2001/0037378 A1 | 11/2001 | Hirayama |
| 2002/0069299 A1 | 6/2002 | Rosener et al. |
| 2002/0089927 A1* | 7/2002 | Fischer ............... H04L 1/08 370/229 |
| 2003/0098671 A1 | 5/2003 | Hochgraf |
| 2004/0062267 A1 | 4/2004 | Minami et al. |
| 2004/0110044 A1 | 6/2004 | McArthur et al. |
| 2004/0226621 A1 | 11/2004 | Phillips et al. |
| 2004/0227621 A1 | 11/2004 | Cope et al. |
| 2005/0005150 A1 | 1/2005 | Ballard |
| 2005/0017848 A1 | 1/2005 | Flen et al. |
| 2005/0043860 A1 | 2/2005 | Petite |
| 2005/0144437 A1 | 6/2005 | Ransom et al. |
| 2005/0207079 A1 | 9/2005 | Tiller et al. |
| 2006/0071757 A1 | 4/2006 | Burghard et al. |
| 2006/0091877 A1 | 5/2006 | Robinson et al. |
| 2006/0152344 A1* | 7/2006 | Mowery, Jr. ......... H04B 3/542 370/331 |
| 2007/0076650 A1 | 4/2007 | Manjeshwar et al. |
| 2007/0100506 A1 | 5/2007 | Teichmann |
| 2007/0101438 A1 | 5/2007 | Govindarajan |
| 2007/0114987 A1 | 5/2007 | Kagan |
| 2007/0162550 A1 | 7/2007 | Rosenberg |
| 2007/0208521 A1 | 9/2007 | Petite et al. |
| 2007/0211401 A1 | 9/2007 | Mak |
| 2007/0237181 A1 | 10/2007 | Cho et al. |
| 2007/0271383 A1 | 11/2007 | Kim et al. |
| 2007/0297425 A1 | 12/2007 | Chirco |
| 2008/0040479 A1 | 2/2008 | Bridge et al. |
| 2008/0109387 A1 | 5/2008 | Deaver et al. |
| 2008/0209481 A1 | 8/2008 | Barrett |
| 2008/0273521 A1 | 11/2008 | Shao et al. |
| 2008/0312851 A1 | 12/2008 | Kagan et al. |
| 2009/0027061 A1 | 1/2009 | Curt et al. |
| 2009/0088907 A1 | 4/2009 | Lewis et al. |
| 2009/0096416 A1 | 4/2009 | Tonegawa et al. |
| 2009/0134699 A1 | 5/2009 | Choi et al. |
| 2009/0210197 A1 | 8/2009 | Cleary |
| 2009/0219932 A1 | 9/2009 | Kobayashi |
| 2009/0240504 A1 | 9/2009 | Pang et al. |
| 2009/0256686 A1 | 10/2009 | Abbot et al. |
| 2009/0304101 A1 | 12/2009 | LoPorto et al. |
| 2010/0005273 A1 | 1/2010 | Lee et al. |
| 2010/0007219 A1 | 1/2010 | de Buda et al. |
| 2010/0007336 A1 | 1/2010 | De Buda |
| 2010/0010857 A1 | 1/2010 | Fadell |
| 2010/0054349 A1 | 3/2010 | Spencer |
| 2010/0134089 A1 | 6/2010 | Uram et al. |
| 2010/0141392 A1 | 6/2010 | Jo et al. |
| 2010/0188260 A1 | 7/2010 | Cornwall et al. |
| 2010/0217549 A1 | 8/2010 | Galvin et al. |
| 2010/0217550 A1 | 8/2010 | Crabtree et al. |
| 2010/0262313 A1 | 10/2010 | Chambers et al. |
| 2010/0262393 A1 | 10/2010 | Sharma et al. |
| 2010/0286840 A1 | 11/2010 | Powell et al. |
| 2010/0296560 A1 | 11/2010 | Sadan et al. |
| 2010/0306533 A1 | 12/2010 | Phatak |
| 2011/0035073 A1 | 2/2011 | Ozog |
| 2011/0040803 A1 | 2/2011 | Pasquero et al. |
| 2011/0043340 A1 | 2/2011 | Kim et al. |
| 2011/0103429 A1 | 5/2011 | Tanaka et al. |
| 2011/0109320 A1 | 5/2011 | Curt et al. |
| 2011/0121654 A1 | 5/2011 | Recker et al. |
| 2011/0122798 A1 | 5/2011 | Hughes et al. |
| 2011/0130992 A1 | 6/2011 | Kolwalkar et al. |
| 2011/0133655 A1 | 6/2011 | Recker et al. |
| 2011/0140911 A1 | 6/2011 | Pant et al. |
| 2011/0196546 A1 | 8/2011 | Muller et al. |
| 2011/0216747 A1 | 9/2011 | Shao et al. |
| 2011/0224935 A1 | 9/2011 | Hampel et al. |
| 2011/0267202 A1 | 11/2011 | Efthymiou et al. |
| 2011/0282508 A1 | 11/2011 | Goutard et al. |
| 2011/0285382 A1 | 11/2011 | Kolwalkar et al. |
| 2012/0036250 A1 | 2/2012 | Vaswani et al. |
| 2012/0041696 A1 | 2/2012 | Sanderford, Jr. et al. |
| 2012/0052870 A1 | 3/2012 | Habicher |
| 2012/0062210 A1 | 3/2012 | Veillette |
| 2012/0062390 A1 | 3/2012 | Solomon |
| 2012/0068784 A1 | 3/2012 | Varadarajan et al. |
| 2012/0075099 A1 | 3/2012 | Brown |
| 2012/0139554 A1 | 6/2012 | Parsons |
| 2012/0155557 A1 | 6/2012 | Bush et al. |
| 2012/0158329 A1 | 6/2012 | Hurri et al. |
| 2012/0185838 A1 | 7/2012 | Schwartzman et al. |
| 2012/0195355 A1 | 8/2012 | El-Essawy et al. |
| 2012/0201145 A1 | 8/2012 | Ree et al. |
| 2012/0201155 A1 | 8/2012 | Du et al. |
| 2012/0232915 A1 | 9/2012 | Bromberger |
| 2012/0242499 A1 | 9/2012 | Ree |
| 2012/0245869 A1 | 9/2012 | Ansari |
| 2012/0262355 A1 | 10/2012 | He et al. |
| 2012/0265355 A1 | 10/2012 | Bernheim et al. |
| 2012/0275526 A1 | 11/2012 | Hughes |
| 2012/0310424 A1 | 12/2012 | Taft |
| 2012/0310558 A1 | 12/2012 | Taft |
| 2012/0313620 A1 | 12/2012 | Swarztrauber et al. |
| 2012/0314782 A1 | 12/2012 | Boivin et al. |
| 2012/0314868 A1 | 12/2012 | Bernheim et al. |
| 2012/0316696 A1 | 12/2012 | Boardman et al. |
| 2012/0323388 A1 | 12/2012 | Littrell et al. |
| 2013/0013232 A1 | 1/2013 | Parwal et al. |
| 2013/0031201 A1 | 1/2013 | Kagan et al. |
| 2013/0034086 A1 | 2/2013 | Martin et al. |

(56) References Cited

U.S. PATENT DOCUMENTS

| | | |
|---|---|---|
| 2013/0132555 A1 | 5/2013 | Wang et al. |
| 2013/0151177 A1 | 6/2013 | Hughes |
| 2013/0193767 A1 | 8/2013 | Carralero et al. |
| 2013/0204450 A1 | 8/2013 | Kagan et al. |
| 2014/0035372 A1 | 2/2014 | Normoyle et al. |
| 2014/0062719 A1 | 3/2014 | Rowitch |
| 2014/0118163 A1 | 5/2014 | Li et al. |
| 2014/0172723 A1 | 6/2014 | Borisov et al. |
| 2014/0191568 A1 | 7/2014 | Partovi |
| 2014/0233620 A1 | 8/2014 | Bernheim et al. |
| 2014/0233662 A1 | 8/2014 | Hansell et al. |
| 2014/0236365 A1 | 8/2014 | Martin et al. |
| 2014/0236366 A1 | 8/2014 | Livadaras et al. |
| 2014/0236506 A1 | 8/2014 | Nikovski et al. |
| 2014/0300210 A1 | 10/2014 | Abi-Ackel et al. |
| 2014/0359595 A1 | 12/2014 | Sehgal et al. |
| 2014/0361907 A1 | 12/2014 | Bernheim et al. |
| 2014/0368189 A1 | 12/2014 | Bernheim et al. |
| 2015/0010093 A1 | 1/2015 | Hansell et al. |
| 2015/0316620 A1 | 11/2015 | Luan et al. |
| 2016/0112378 A1 | 4/2016 | Bernheim et al. |
| 2016/0124421 A1 | 5/2016 | Hansell et al. |
| 2016/0127242 A1 | 5/2016 | Bernheim et al. |
| 2016/0164287 A1 | 6/2016 | Bernheim |
| 2016/0204991 A1 | 7/2016 | Martin et al. |
| 2016/0285511 A1 | 9/2016 | Hansell et al. |

FOREIGN PATENT DOCUMENTS

| | | |
|---|---|---|
| EP | 1901145 A2 | 3/2008 |
| EP | 2330430 A1 | 6/2011 |
| EP | 2566125 A1 | 3/2013 |
| JP | 2003259696 A | 9/2003 |
| JP | 2003339120 A | 11/2003 |
| JP | 2004147063 A | 5/2004 |
| JP | 2005252671 A | 9/2005 |
| JP | 2006262570 A | 9/2006 |
| JP | 2007185083 A | 7/2007 |
| JP | 2008508781 A1 | 3/2008 |
| JP | 2008098812 A | 4/2008 |
| JP | 2008124859 A | 5/2008 |
| JP | 2013005718 A1 | 1/2013 |
| WO | 2009067250 A1 | 5/2009 |
| WO | 2010027421 A2 | 3/2010 |
| WO | 2010141859 A1 | 12/2010 |
| WO | 2013013162 A2 | 1/2013 |
| WO | 2014006662 A1 | 1/2014 |

OTHER PUBLICATIONS

Partial Supplementary European Search Report for European Patent Application No. 14754714.5, dated Oct. 6, 2016, 6 pages.

Non-Final Office Action for U.S. Appl. No. 13/896,029, dated Nov. 10, 2016, 18 pages.

Notice of Allowance for U.S. Appl. No. 13/871,944, dated Oct. 4, 2016, 9 pages.

Non-Final Office Action for U.S. Appl. No. 14/304,648, dated Sep. 7, 2016, 4 pages.

Notice of Allowance for U.S. Appl. No. 14/720,780, dated Nov. 4, 2016, 5 pages.

Author Unknown, "MicroPianet® Voltage Regulators," EnergyIdeas Clearinghouse PTR #6.4, Product and Technology Review, Jun. 2008, 6 pages, http://www.energyideas.org/documents/factsheets/PTR/Microplanet.pdf.

Author Unknown, "Prime Alliance Official Website," Web, Date Accessed: Nov. 4, 2015, 3 pages, http://www.prime-alliance.org/.

Author Unknown, "The G3 PLC Alliance Unveils its Interoperability process," The G3-PLC Alliance, Oct. 8, 2012, Paris, France, http://www.g3-plc.com/content/press-releases, p. 1.

Author Unknown, "TWACS Low Frequency Power Line Communication Signals Problematic to Public Health," dated May 3, 2013, 20 pages, http://www.eiwellspring.org/smartmeter/TWACS.pdf.

Author Unknown, "Universal Powerline Bus Communication Technology Overview," Powerline Control Services, Jan. 8, 2002, 13 pages, http://pulseworx.com/downloads/upb/UpbOverview.pdf.

Baggini, Angelo "Handbook of Power Quality" John Wiley & Sons, Ltd., 2008, 65 pages.

Bates, Michael, "CVR has Potential Beyond Pushing Efficiencies on Feeders." renewGRID, Mar. 26, 2012, 2 pages, http://www.renew-grid.com/e107plugins/contenl/contenl.php?contenl.8215.

Bresesti, Paola et al., "SDNO: Smart Distribution Network Operation Project", Power Engineering Society General Meeting, IEEE, 2007, 4 pages.

Choi, Moonsuk et al., "Design of Integrated Meter Reading System based on Power-Line Communication", Power Line Communications and Its Applications, IEEE, International Symposium, 2008, pp. 280-284.

Collins, Dermot et al., "Transmission on Power Line Cables," Telektronikk, vol. 95, No. 2/3, 1999, pp. 134-137.

Dilek, M., "Integrated Design of Electrical Distribution Systems: Phase Balancing and Phase Prediction Case Studies," Dissertation, 2001, 150 pages, http://scholar.lib.vt.edu/theses/available/etd-11132001-222401/.

Goh, Chong Hock K., "A Current Study of Automatic Meter Reading Solutions via Power Line Communications," 19 pages, http://wpweb2k.gsia.cmu.edu/ceic/publicatons.htm. (Published 2003 or later as evidenced by the bibliography).

Ha, K. A., "Power Line Communication Technology," Presentation at Hong Kong Institute of Engineers Seminar on Last Mile Technology, Jun. 20, 2003, 24 pages.

Hooijen, Olaf G. "A Channel Model for the Residential Power Circuit Used as a Digital Communications Medium," IEEE Transactions on Electromagnetic Compatibility, vol. 40, No. 4, Nov. 1998, pp. 331-336.

McGhee, Jim et al., "Smart High Voltage Substation based on IEC 61850 Process Bus and IEEE 1588 Time Synchronization" 2010 First IEEE International Conference on Smart Grid Communications, IEEE, Oct. 4-6, 2010, pp. 489-494.

Mitchell, Travis, "Dominion Conservation Voltage Reduction software reduces energy use by 2.8%," Fierce Energy Daily, Sep. 27, 2011, 3 pages, http://www.fierceenergy.com/story/dominion-conservation-voltage-reduction-software-reduces-energy-use-28/2011-09-27.

Montoya, Luis F.,"Power Line Communications Performance Overview of the Physical Layer of Available Protocols," Thesis of Research, University of Florida, Gainesville, Florida, Date Unknown, pp. 1-15.

Moreno-Munoz A., et al., "Integrating Power Quality to Automated Meter Reading", IEEE Industrial Electronics Magazine, IEEE, US, vol. 2, No. 2, Jun. 17, 2008, pp. 10-18.

Newbury, John, "Efficient Communication Services Using the Low Voltage Distribution Line," Proceedings of 2002 PES Winter Meeting, IEEE, 2002, pp. 579-591.

Nyack, Cuthbert A., "Convolution and Autocorrelation," Web, Date Accessed: Nov. 4, 2015, 3 pages, http://cnyack.homestead.com/files/aconv/convau1.htm.

Pallares-Lopez et al., "Embedding synchronism in SmartGrid with IEEE1588-based for Intelligent Electronics," 2010 First IEEE International Conference on Smart Grid Communications, published/presented Oct. 4-6, 2010, Gaithersburg, Maryland, 7 pages.

Pavlidou, Niovi et al., "Power Line Communications: State of the Art and Future Trends," IEEE Communications Magazine, IEEE, vol. 41, No. 4, Apr. 2003, pp. 34-40.

Rye, Dave, "The X-10 Powerhouse Power Line Interface Model #PL513 and Two-Way Power Line Interface Model #TW523," X-10 Inc., X-10.RTM. Powerhouse (TM) Technical Note, Revision 2.4, 1991, 12 pages.

Schickhuber, Gerald et al., "Control Using Power Lines—A European View," Computing & Control Engineering Journal, vol. 8, No. 4, Aug. 1997, pp. 180-184.

Sherman et al, "Location Authentication through Power Line Communication: Design, Protocol, and Analysis of a New Out of Band Strategy," Cyber Defense Lab, Department of CSEE, University of Maryland, Baltimore County, IEEE, 2010, pp. 279-284.

(56) References Cited

OTHER PUBLICATIONS

Van Rensburg, Petrus A. Hanse et al., "Design of a Bidirectional Impedance-Adapting Transformer Coupling circuit for Low-Voltage Power-Line Communications," IEEE Transactions on Power Delivery, IEEE, vol. 20, No. 1, Jan. 2005, pp. 64-70.
International Search Report for PCT/US2014/016538, dated Jun. 16, 2014, 3 pages.
International Preliminary Report on Patentability for PCT/US2014/016538, dated Sep. 3, 2015, 10 pages.
International Search Report for PCT/US2014/016540, dated Jun. 17, 2014, 3 pages.
International Preliminary Report on Patentability for PCT/US2014/016540, dated Sep. 3, 2015, 9 pages.
International Search Report for PCT/US2014/016535, dated Jun. 3, 2014, 2 pages.
International Preliminary Report on Patentability for PCT/US2014/016535, dated Sep. 3, 2015, 8 pages.
International Search Report and Written Opinion for PCT/US2014/041396, dated Oct. 29, 2014, 12 pages.
International Search Report and Written Opinion for PCT/US2014/042300, dated Oct. 20, 2014, 16 pages.
International Search Report and Written Opinion for PCT/US2014/042393, dated Oct. 20, 2014, 15 pages.
International Search Report for PCT/US2009/046644, dated Mar. 2, 2010, 7 pages.
International Preliminary Report on Patentability for PCT/US2009/046644, dated Dec. 6, 2010, 10 pages.
International Search Report for PCT/US2012/033789, dated Sep. 6, 2012, 4 pages.
International Search Report for PCT/US2012/041971, dated Dec. 7, 2012, 5 pages.
International Search Report for PCT/US2012/049524, dated Jan. 3, 2013, 3 pages.
Non-Final Office Action for U.S. Appl. No. 13/566,481, dated Aug. 7, 2015, 27 pages.
Non-Final Office Action for U.S. Appl. No. 13/493,983, dated Feb. 5, 2014, 11 pages.
Final Office Action for U.S. Appl. No. 13/493,983, dated Oct. 31, 2014, 12 pages.
Non-Final Office Action for U.S. Appl. No. 13/448,005, dated Sep. 11, 2014, 20 pages.
Non-Final Office Action for U.S. Appl. No. 13/448,005, dated Apr. 15, 2015, 22 pages.
Non-Final Office Action for U.S. Appl. No. 12/480,493, dated Jul. 16, 2012, 24 pages.
Notice of Allowance and Examiner-Initiated Interview Summary for U.S. Appl. No. 12/480,493, dated Jun. 20, 2013, 13 pages.
Non-Final Office Action for U.S. Appl. No. 13/896,029, dated Sep. 18, 2015, 16 pages.
Non-Final Office Action for U.S. Appl. No. 13/871,944, dated Oct. 16, 2015, 13 pages.
Non-Final Office Action for U.S. Appl. No. 13/888,102, dated Jul. 9, 2015, 18 pages.
Search Report for Japanese Patent Application No. 2011-512749, dated Aug. 14, 2013, 29 pages.
Office Action for Japanese Patent Application No. 2011-512749, dated Sep. 4, 2013, 7 pages.
International Preliminary Report on Patentability for PCT/US2014/041396, dated Dec. 17, 2015, 8 pages.
International Preliminary Report on Patentability for PCT/US2014/042300, dated Dec. 23, 2015, 9 pages.
International Preliminary Report on Patentability for PCT/US2014/042393, dated Dec. 23, 2015, 11 pages.
Office Action for Canadian Patent Application No. 2,727,034, dated Nov. 26, 2015, 4 pages.
Decision of Final Rejection for Japanese Patent Application No. 2014-119504, dated Nov. 10, 2015, 5 pages.
Translation of Decision to Grant for Japanese Patent Application No. 2014-119505, dated Dec. 15, 2015, 3 pages.
Office Action for Cuban Patent Application No. 2015-0088, dated Oct. 30, 2015, 3 pages.
Final Office Action for U.S. Appl. No. 13/888,102, dated Dec. 24, 2015, 18 pages.
Non-Final Office Action for U.S. Appl. No. 13/911,849, dated Nov. 24, 2015, 15 pages.
Sendin, Alberto, et al., "Enhanced Operation of Electricity Distribution Grids Through Smart Metering PLC Network Monitoring, Analysis and Grid Conditioning," Energies, vol. 6, Issue 1, Jan. 21, 2013, www.mdpi.com/journal/energies, pp. 539-556.
Colson, C.M., "Algorithms for Distributed Decision-Making for Multi-agent Microgrid Power Management," IEEE Power and Energy Society General Meeting, Jul. 24-29, 2011, San Diego, California, IEEE, pp. 1-8.
Wetula, Andrzej, "A Hilbert Transform Based Algorithm for Detection of a Complex Envelope of a Power Grid Signals—an Implementation," Journal of Electrical Power Quality and Utilisation, vol. 14, Issue 2, 2008, EPQU Journal, pp. 13-18.
Partial Supplementary European Search Report for European Patent Application No. 14754343.3, dated Feb. 8, 2016, 5 pages.
Extended European Search Report for European Patent Application No. 14754343.3, dated May 24, 2016, 12 pages.
Examination Report for European Patent Application No. 09759619.1, dated May 13, 2016, 7 pages.
Notice of Allowance and Examiner Initiated Interview Summary for U.S. Appl. No. 13/911,849, dated Apr. 5, 2016, 10 pages.
Corrected Notice of Allowance for U.S. Appl. No. 13/911,849, dated May 31, 2016, 4 pages.
Non-Final Office Action for U.S. Appl. No. 14/304,035, dated Feb. 25, 2016, 22 pages.
Final Office Action for U.S. Appl. No. 13/448,005, dated Jun. 6, 2016, 11 pages.
Non-Final Office Action for U.S. Appl. No. 14/720,780, dated Feb. 26, 2016, 7 pages.
Notice of Allowance for U.S. Appl. No. 13/566,481, dated Feb. 26, 2016, 7 pages.
International Search Report and Written Opinion for International Patent Application No. PCT/US2015/058423, dated Jan. 19, 2016, 12 pages.
International Search Report and Written Opinion for International Patent Application No. PCT/US2015/058492, dated Feb. 26, 2016, 18 pages.
International Search Report and Written Opinion for International Patent Application No. PCT/US2015/063752, dated Mar. 24, 2016, 16 pages.
International Preliminary Report on Patentability for International Patent Application No. PCT/US2012/33789, dated Oct. 24, 2013, 10 pages.
International Preliminary Report on Patentability for PCT/US2012/041971, dated Dec. 10, 2013, 6 pages.
International Preliminary Report on Patentability for PCT/US2012/049524, dated Feb. 4, 2014, 7 pages.
Final Office Action for U.S. Appl. No. 13/896,029, dated Jun. 22, 2016, 22 pages.
Final Office Action for U.S. Appl. No. 14/304,035, dated Aug. 26, 2016, 18 pages.
Final Office Action for U.S. Appl. No. 14/720,780, dated Sep. 1, 2016, 9 pages.
Extended European Search Report for European Patent Application No. 14754339.1, dated Jan. 16, 2017, 10 pages.
Office Action No. 13556 for Colombian Patent Application No. 15-222367, dated Nov. 28, 2016, 13 pages.
Examination Report No. 1 for Australian Patent Application No. 2014219244, dated Dec. 21, 2016, 4 pages.
Extended European Search Report for European Patent Application No. 14754714.5, dated Jan. 16, 2017, 10 pages.
Extended European Search Report for European Patent Application No. 14808081.5, dated Jan. 30, 2017, 7 pages.
Extended European Search Report for European Patent Application No. 14810273.4, dated Feb. 1, 2017, 12 pages.
Extended European Search Report for European Patent Application No. 14811042.2, dated Jan. 2, 2017, 7 pages.

(56) References Cited

OTHER PUBLICATIONS

Examination Report No. 1 for Australian Patent Application No. 2014219246, dated Dec. 22, 2016, 3 pages.
Advisory Action for U.S. Appl. No. 14/304,035, dated Nov. 30, 2016, 3 pages.
Non-Final Office Action for U.S. Appl. No. 15/177,930, dated Mar. 3, 2017, 6 pages.
Final Office Action for U.S. Appl. No. 14/304,648, dated Mar. 9, 2017, 7 pages.
Yan, Ping et al., "Study of Linear Models in Steady State Load Flow Analysis of Power Systems," IEEE Power Engineering Society Winter Meeting, vol. 1, Jan. 27-31, 2002, New York, NY, IEEE, pp. 666-671.
Translated Summary of Office Action No. 4963 for Columbian Patent Application No. 15-222371, dated Apr. 5, 2017, 3 pages.
International Preliminary Report on Patentability for International Patent Application No. PCT/US2015/058423, dated May 11, 2017, 8 pages.
International Preliminary Report on Patentability for International Patent Application No. PCT/US2015/058492, dated May 11, 2017, 10 pages.
Non-Final Office Action for U.S. Appl. No. 14/304,035, dated May 17, 2017, 22 pages.
Final Office Action for U.S. Appl. No. 14/304,648, dated May 19, 2017, 7 pages.
Advisory Action for U.S. Appl. No. 14/304,648, dated May 24, 2017, 3 pages.
Non-Final Office Action for U.S. Appl. No. 14/928,783, dated May 8, 2017, 16 pages.
Examination Report No. 1 for Australian Patent Application No. 2014219247, dated Apr. 26, 2017, 4 pages.
Second Office Action for Chilean Patent Application No. 2323-2015, dated May 17, 2017, 14 pages.
Second Office Action for Chilean Patent Application No. 2322-2015, dated May 17, 2017, 13 pages.
First Office Action for Chinese Patent Application No. 201480009549.5, dated May 31, 2017, 9 pages.
Examination Report No. 1 for Australian Patent Application No. 2014277951, dated Jun. 8, 2017, 4 pages.
Office Action Summary for Columbian Patent Application No. 7058, dated Jun. 16, 2017, 2 pages.
International Preliminary Report on Patentability for International Patent Application No. PCT/US2015/063752, dated Jun. 15, 2017, 12 pages.
Non-Final Office Action for U.S. Appl. No. 13/871,944, dated Jun. 15, 2017, 14 pages.
First Office Action for Chilean Patent Application No. 2325-2015, dated Jan. 26, 2017, 13 pages.
First Office Action for Chilean Patent Application No. 2323-2015, dated Jan. 26, 2017, 15 pages.
Office Action No. 11851, Colombian Patent Application No. 15-222367, dated Mar. 17, 2017, 19 pages
First Office Action for Chilean Patent Application No. 2322-2015, dated Jan. 26, 2017, 15 pages.
First Office Action for Chinese Patent Application No. 201480032631.X, dated Feb. 27, 2017, 5 pages.
First Office Action for Chinese Patent Application No. 201480034010.5, dated Feb. 17, 2017, 7 pages.
U.S. Appl. No. 13/896,029, filed May 16, 2013.
U.S. Appl. No. 13/871,944, filed Apr. 26, 2013.
U.S. Appl. No. 13/888,102, filed May 6, 2013.
U.S. Appl. No. 15/078,646, filed Mar. 23, 2016.
U.S. Appl. No. 13/911,849, filed Jun. 6, 2013.
U.S. Appl. No. 14/304,035, filed Jun. 13, 2014.
U.S. Appl. No. 14/304,648, filed Jun. 13, 2014.
U.S. Appl. No. 13/448,005, filed Apr. 16, 2012.
U.S. Appl. No. 14/720,780, filed May 23, 2015.
U.S. Appl. No. 13/566,481, filed Aug. 3, 2012.
U.S. Appl. No. 14/928,783, filed Oct. 30, 2015.
U.S. Appl. No. 14/929,087, filed Oct. 30, 2015.
U.S. Appl. No. 14/958,385, filed Dec. 3, 2015.
U.S. Appl. No. 15/177,930, filed Jun. 9, 2016.
U.S. Appl. No. 15/450,153, filed Mar. 6, 2017.
U.S. Appl. No. 15/395,656, filed Dec. 30, 2016.
First Office Action for Chinese Patent Application No. 201480009551.2, dated Jun. 19, 2017, 9 pages.
Extended European Search Report for European Patent Application No. 17173049.2, dated Aug. 11, 2017, 8 pages.
Examination report No. 1 for Australian Patent Application No. 2014277983, dated Jun. 16, 2017, 4 pages.
Non-Final Office Action for U.S. Appl. No. 13/896,029, dated Jul. 20, 2017, 17 pages.
Advisory Action for U.S. Appl. No. 14/304,648, dated Aug. 17, 2017, 3 pages.
Notice of Allowance for U.S. Appl. No. 14/929,087, dated Aug. 15, 2017, 9 pages.
Second Office Action for Chinese Patent Application No. 201480032631.X, dated Sep. 4, 2017, 5 pages.
Second Office Action for Chinese Patent Application No. 201480034010.5, dated Aug. 2, 2017, 5 pages.
Final Office Action for U.S. Appl. No. 14/304,035, dated Oct. 5, 2017, 16 pages.

* cited by examiner

Figure 1.

Figure 4.
Real Broadcast Queue

Figure 5.
Simulated Broadcast Queue

SYSTEM AND METHODS FOR SYNCHRONIZING EDGE DEVICES ON CHANNELS WITHOUT CARRIER SENSE

CROSS REFERENCE TO RELATED APPLICATIONS

This application is a continuation of U.S. patent application Ser. No. 13/566,481, filed on Aug. 3, 2012, subsequently issued as U.S. Pat. No. 9,380,545, entitled "SYSTEM AND METHODS FOR SYNCHRONIZING EDGE DEVICES ON CHANNELS WITHOUT CARRIER SENSE," which claims the benefit of U.S. Provisional Application No. 61/514,726, filed on Aug. 3, 2011, entitled "SYSTEM AND METHOD FOR SYNCHRONIZING EDGE DEVICES TRANSMITTING ON A MULTIPLICITY OF SLOTTED CHANNELS WITHOUT CARRIER SENSE, USING UNSYNCHRONIZED QUEUED MESSAGES ON A HIGHLY CONTRAINED CENTRAL BROADCAST CHANNEL OR A CLIENT-SERVER SIMULATION OF SUCH A CHANNEL," the disclosures of each of which are hereby incorporated herein by reference in their entireties.

BACKGROUND OF THE INVENTION

1. Field of the Invention

The present invention is directed generally toward the domain of network resource management where the message bearing substrate for a multiplicity of transmitters sited at or near the edge of the network has limited bandwidth and does not support a practical carrier sense mechanism. An example of such a network is the electrical distribution grid. In such a network, if two or more transmitted messages overlap in time (collide) on the same bearer channel, neither message is decipherable at its destination. Slotted protocols, where every transmitter is allocated specific times wherein it is permitted to transmit, can maximize the utilization of such network. However, collisions are prevented only if the time clocks on every transmitter are precisely synchronized with one another. It is understood that "precisely" means to have a known tolerance as opposed to "exactly." The present invention describes a system and diverse methods for synchronizing endpoints on such a network.

2. Background of the Invention

The electrical grid in the United States and most other areas of the world is historically divided into two networks: the transmission grid and the distribution grid. The transmission grid originates at a generation point, such as a coal-burning or atomic power plant, or a hydroelectric generator at a dam. Power is generated, and transmitted to distribution points, called distribution substations, via a highly controlled and regulated, redundant, and thoroughly instrumented high voltage network which has at its edge a collection of distribution substations. Over the last century, as the use of electrical power became more ubiquitous and more essential, and as a complex market in the trading and sharing of electrical power emerged, the technology of the transmission grid largely kept pace with the technological requirements of the market.

The second network, the distribution grid, is the portion of the electrical grid that originates at the distribution substations and has at its edge a collection of residential, commercial, and industrial consumers of energy. In contrast to the transmission grid, the technology of the distribution grid has remained relatively static since the mid-1930s until very recent years. Today, as concern grows over the environmental effects of fossil fuel usage and the depletion of non-renewable energy sources, interest has increased in augmenting the electrical distribution grid with communication instruments. The primary goals of this activity are energy-related goals such as energy conservation, resource conservation, cost containment, and continuity of service.

It is desirable when so augmenting the distribution grid with communication instruments to employ the grid itself as the communication medium. The medium-voltage (>1 KV) power lines that comprise the bulk of the distribution grid discourage tampering, snooping, and spooling. Public utilities in the United States are subject to a statutory accounting model that favors capital investment over facilities costs, and so would rather communicate via the grid, a network they own, than the Internet or other wide-area wired or wireless network infrastructure, which they must lease or for which they pay usage charges. Finally, using the grid as the communication medium enables a mechanism that allows the network to infer the schematic location of the transmitter on the grid from characteristics of the received signal at another location on the grid. This capability has high value to utilities for applications such as fault isolation, energy optimization, and recovery management. Finally, the electrical grid is (reflexively) always present where instrumentation of the grid is needed, whereas nearly all utilities encounter situations where conditions do not support the use of other types of networks, or where the cost of other network types is prohibitive.

Some characteristics of the electrical grid are greatly different from other networks. First, as in many wireless applications, but not in other wired applications such as Ethernet, there is no carrier sense. In other words, one transmitter will generally not be able to know if another transmitter is transmitting on the same channel it wishes to use. If two transmitters attempt to use the same channel simultaneously, neither signal will be correctly received. Second, the data rate achievable using the power grid as a transmission medium is low compared to modern fiber or wireless networks. Finally, the network is hierarchical in structure and asymmetrical in transmission cost. It is much easier and cheaper to transmit from low voltage to high voltage on the electrical distribution grid than from high voltage to low voltage.

Despite these apparently limiting characteristics of the medium, the high value of the enabled applications, especially inferring the schematic location of the transmitter, drives the development of systems and methods for maximizing the utilization of a network with these characteristics. While the desire to use the electrical distribution grid as the network substrate is described in one aspect of the present invention, it must be noted that other network media have similar characteristics. There is nothing about the present invention that limits its application to only the electrical distribution grid.

Most conventional networks take advantage of the stochastic nature of transmission patterns. Transmissions from the edge of the network are initiated unpredictably and infrequently, from any specific transmitter, with respect to the data rate of which the conventional network is capable. The actual utilization of the network, expressed as a percentage of the maximum achievable data rate if one transmitter sent continuously over every available distinct path, is low. These networks, such as the Internet, are optimized for high response time at the expense of lower throughput. Conversely, in data collection networks of the type, topology, and other characteristics described herein, it is both feasible and desirable to drive throughput (and utilization) as close to 100% as possible, when measuring transmissions from the edge of the network to a central data collection point.

It is well known in the art that if it is possible to predict how much data an endpoint (or edge device) will transmit, and how frequently transmissions must occur, then the most efficient type of network protocol is one called a slotted protocol. In a pure slotted protocol, each edge device is assigned a specific set of times and durations, applied on a cyclical basis, when it is permitted to transmit. These times and durations, called slots, are assigned in such a way that a transmission from on edge device never collides with a transmission from any other edge device using the same physical and frequency-based channel. In this model, the theoretical edge-to-hub network utilization achievable is 100% with no message loss.

The theoretical utilization can only be approached if the system clocks on every edge device are precisely synchronized. In the simplest case, this is accomplished by having all the edge devices able to receive a broadcast timing pulse that each device receives simultaneously. This is not always easy to achieve even in high-bandwidth two-way networks, with the result that prior-art algorithms such as the Network Time Protocol (NTP) have been invented to compensate for network latency variations in receiving timing signals. However, NTP is usually not a feasible solution in the special type of network described herein, because it requires too much two-way communication.

SUMMARY OF THE INVENTION

The present invention comprises a system of edge devices called Intelligent Communicating Devices (ICDs), which transmit using a slotted protocol according to a predefined or centrally assigned schedule, on a network typically lacking in carrier sense. These ICDs transmit to a Server at a centrally located data aggregation point with a Receiver capable of receiving transmissions from ICDs on at least one channel, but only capable of receiving a single transmission per channel at a given time. The Server also controls a Central Transmitter (CT) which can be used to send messages to the ICDs, both to assign transmission slots and other policies to ICDs (provisioning), and to provide timing information to the edge devices to ensure that transmissions by devices sharing the same communication channel do not collide. Access by the server to the CT is constrained.

Available CT technologies are of at least two types. One type, those based on true broadcast technology, are capable of broadcasting to all ICDs simultaneously, and may initiate a broadcast at any time. On-grid transmitters fall into this category, but so do some radio-frequency technologies. A second type of CT technology is based on conventional two-way network architectures and uses conventional two-way protocols such as TCP/IP. CTs of the second type are typically not capable of broadcasting to all ICDs simultaneously, and are not capable of initiating contact with any ICD. CTs of the second type are limited to responding to contacts initiated by an ICD. In both architectures constraints exist that limit the timing and frequency of messages from the CT to the ICDs. Methods are disclosed whereby the ICDs may be synchronized despite the constraints imposed by the characteristics of the CT type in use.

DETAILED DESCRIPTION OF THE INVENTION

The present invention is directed generally toward the field of network management and provisioning, and comprises a system of edge devices called Intelligent Communicating Devices (ICDs), which transmit using a slotted protocol according to a predefined or centrally assigned schedule, on a network typically lacking in carrier sense. These ICDs transmit to a Server at a centrally located data aggregation point with a Receiver capable of receiving transmissions from ICDs on at least one channel, but only capable of receiving a single transmission per channel at a given time. The Server also controls a central transmitter (CT) which can be used both to assign transmission slots to ICDs, and to provide timing information to the edge devices to ensure that transmissions by devices sharing the same communication channel. Access by the server to the CT is constrained. Among the reasons why access is constrained are that the cost of the CT device and associated infrastructure is high enough that the system is effective only if shared by multiple applications and that the bandwidth of the CT, or the share of the bandwidth of the CT available to the system of the present invention, is limited. In some CT architectures both these constraints and others may apply. Typically the CT cannot guarantee the exact transmission time of any message. Methods are disclosed whereby the ICDs may be synchronized despite the constraints imposed by the characteristics of the CT. Distinct methods are required depending on the specific capabilities of the CT device and infrastructure which are in place. If the CT is capable of true broadcast, initiating the transmission of a message to all CTs simultaneously at a time unspecified and unknown to the ICDs, then one method is used. If the CT cannot initiate such a broadcast but allows two-way communication, then another method is used.

The distinct workings of the CT system may be hidden from the application software on the Server and on the ICDs from differences in messaging behavior resulting from the capabilities of the CT.

Endpoint Behaviors.

Figure 1:
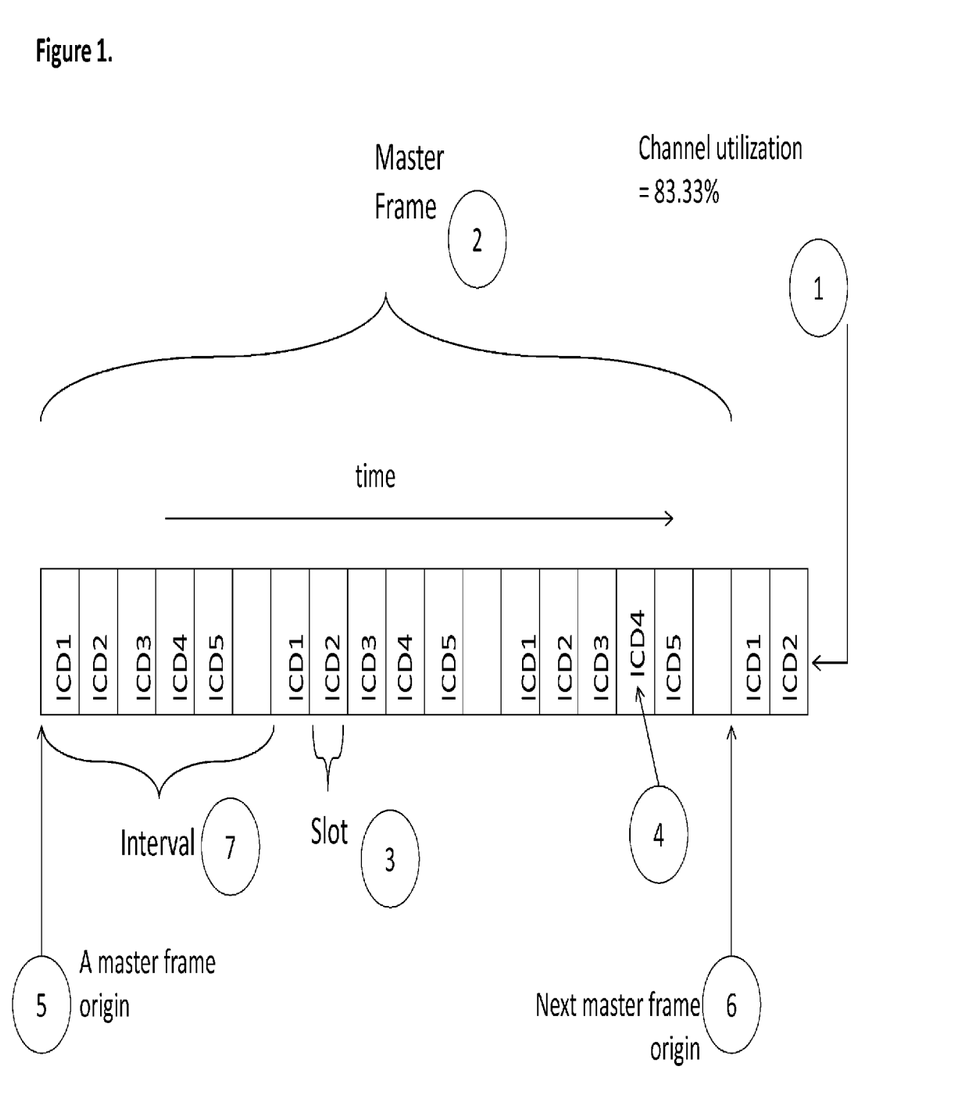
FIG. 1 illustrates a potential organization of a channel on which transmissions by ICDs are governed by a slotted protocol, and the channel is used by multiple synchronized endpoints.

FIG. 1 illustrates a segment in time of the utilization of an edge-to-aggregation-point data-bearing channel 1, which is organized according to a method of the present invention, and which is presently utilized by a collection of five ICDs. The time line of the channel 1 is organized into an indefinitely recurring sequence of Master Frames which are further subdivided into Slots 3. The segment of time in FIG. 1 comprises an entire Master Frame 2 beginning at Master Frame Origin 5 and ending with the following Master Frame Origin 6. Each occupied slot in FIG. 1 is marked with the ID of the ICD which is granted a Permission 4 to transmit in that slot. A Permission 4 is expressed in terms of the offset in slots for the first transmission with each Master Frame, the Interval 7 between transmissions, and the maximum number of transmissions permitted within a Master Frame. A Permission remains in force until it is revoked, so that an ICD that has sent its maximum number of transmissions in the current master frame may begin transmitting again after the next Master Frame Origin (MFO). There is no requirement that a next Master Frame originate immediately following the last slot in a first Master Frame. Dead or unused time in the Master Frame duration is permitted. This allows for application-specific adjustments in the Master Frame Origin, such as keeping synchronized with external environmental factors such as the diurnal cycle. The Origin in time of each Master Frame is announced by the CT in advance of the time when the Master Frame actually begins.

Although ICDs are granted permission to transmit in a designated slot or collection of slots within each master frame in perpetuity or until the grant is revoked, an ICD does not infer the origin of the next Master Frame based solely on its time clock. An ICD will only transmit when all the following conditions are met: a) it has received a Master Frame Announcement (MFA) from the CT indicating when the next Master Frame will begin; and b) according to the ICD's local time clock the announced Master Frame has begun; and c) according to the ICD's local time clock a slot has arrived in which the ICD has permission to transmit.

The Master Frame Announcement, which is generated by the Data Collection Server, alerts endpoints in advance as to the future time of the origin of the next upcoming Master Frame. In its simplest form, the Master Frame Announcement needs to contain only three data elements: the Packet Type, the precise future time of the next Master Frame origin, and the precise time at which the transmission of this Master Frame Announcement began. The MFA may contain other information dictated by the network topology or network policy. The MFA that contains the time of the next Master Frame Origin (MFO) may be transmitted as soon after the origin of the current Master Frame as the time of the next MFO is known. Further, the MFA may be broadcast multiple times during one Master Frame, reducing to near zero the probability that some otherwise functional endpoint will fail to receive the MFA.

The implementation of a Broadcast Transmission Queue may depend on the capabilities of the CT, but the interface presented to the applications or other applications that place messages into the Broadcast Transmission Queue is uniform regardless of the type of CT in use. While the general concept of a transmission queue is well known in the art, achieving endpoint synchronization regardless of the type of CT in use requires appropriate management of the transmission queue.

Embodiment 1

Figure 2:
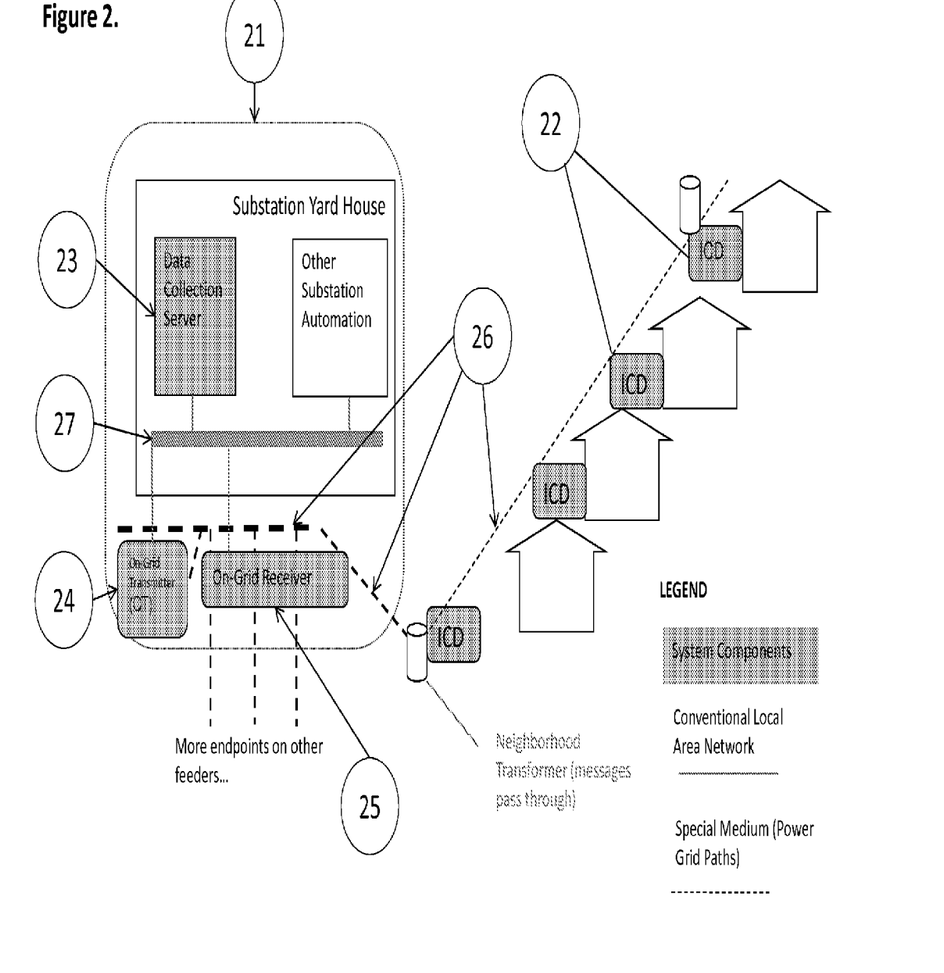
FIG. 2 illustrates an on-grid network where the CT broadcasts such that all ICDs receive every broadcast simultaneously, but where the number of broadcasts is constrained and the specific time of a broadcast cannot be guaranteed.

In a first embodiment of the invention, FIG. 2 illustrates an electrical distribution substation 21 from which originates an electrical distribution grid 26. The substation 21 contains a Server 23, a CT 24, and a Receiver 25. The Server has conventional two-way network communication with the CT and Receiver via Local Area Network 27. The network medium for the slotted edge to aggregation point transmissions used by the ICDs is the electrical distribution grid 26, and the network medium for transmission from the aggregation point to the edge is also the electrical distribution grid 26. At or near the edge of the electrical distribution grid are attached one or more ICDs 22. The one or more ICDs contain a system clock, a processor, storage for programs and data, and a transceiver capable of sending messages on the electrical distribution grid 26 to Receiver 25, and receiving messages sent by CT 24. The network medium provides at least one Edge-to-Aggregation point (E2A) channels, and one Aggregation-to-Edge-Point (A2E) channel. In this embodiment, the A2E channel is a broadcast channel and messages from the CT 24 are received by all ICDs attached to the electrical distribution grid 26 simultaneously with respect to the tolerances of the slotted protocol used to arbitrate the use of the multiplicity of slotted E2A channels among the ICDs on the electrical distribution grid.

A collision is defined as a transmission from a first ICD coinciding with or overlapping with the transmission of a second ICD, such that the message transmitted from neither ICD is decipherable at the Receiver 25. To prevent collisions, all the ICDs 22 which share a common E2A network medium (here, the electrical distribution grid 26 originating at substation 21) must be synchronized in time to within the tolerances of the slotted protocol.

Some of the prior art on collision prevention in similar contexts focuses on having the endpoints (here, ICDs) engage in collision avoidance by sensing the transmissions of other endpoints. However, because of the physical nature of the electrical grid as a transmission medium, these methods are not generally effective. Most ICDs cannot reliably detect the activity of most other ICDs. In some cases an ICD will be unable to detect the activity of any other ICD.

Other prior art relies on a shared broadcast system clock whose "ticks" (precise synchronous announcements of the time or markers of time intervals) are available to all endpoints. The prior art requires a dedicated and relatively high-bandwidth broadcast channel, and is the solution used (for example) in some wireless RF networks. However, in this embodiment of the invention, the CT 24 can only transmit at low frequencies, and a multiplicity of applications are placing messages in the CT's job queue so that it cannot be considered to be dedicated to the task of synchronization. Consequently, if the prior art method of synchronizing the ICDs by transmitting a timing pulse at the exact Master Frame Origin were used, then it would often become necessary to interrupt other transmissions in progress to do so. Because the A2E channel must be managed as a scarce resource, this is undesirable.

According to this embodiment, the A2E channel is constrained to have the following characteristics not typical in the prior art: The number of broadcasts permitted per hour is highly limited, in some cases to 10 per hour or even fewer. The limitation may be imposed due to duty cycle of the transmitter or due to the cost of transmitting.

The length of a broadcast burst is sharply constrained, often to as little as a few hundred bits. The precise timing of a CT transmission cannot be guaranteed because the A2E channel and CT are shared by multiple applications. Timing transmissions such as Master Frame Announcements can be prioritized to the head of the transmission queue, but cannot interrupt a transmission in progress. On-grid transmitters operating under the constraints described in this embodiment are well known in the art. An Audio Frequency Ripple Controller (AFRC) is an example of such a device.

Figure 4:
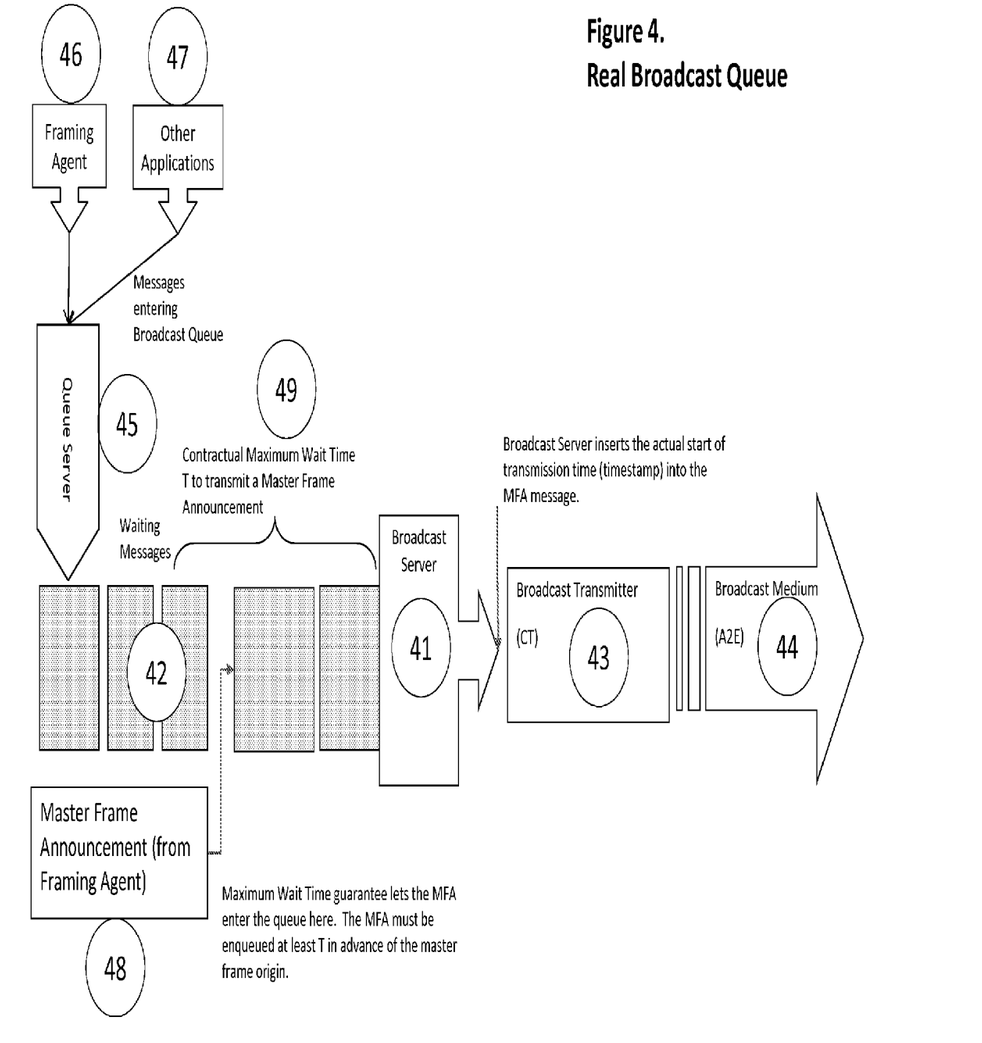
FIG. 4 illustrates the software model for the transmission queue of FIG. 2 with a true broadcast CT.

FIG. 4 illustrates an implementation of the Broadcast Transmission Queue for a CT constrained as described in this Embodiment of the present invention. The implementation consists of a Queue Server 45 that accepts timing messages from a Framing Agent 46 and also from other applications 47. Queue Server 45 places messages into a storage area called the Queue 43 according to rules derived from the Service-Level Agreement (SLA) or agreements between the Queue Server and the Framing Agent 46 and other applications 47. These service levels specify a Contractual Maximum Wait Time 49, which may be different for every application or message type. FIG. 4 illustrates how the Queue Server 45 places the Master Frame Announcement 48 into the Queue 42 ahead of other messages already waiting in order to ensure that the MFA will be transmitted within the Contractual Maximum Wait Time 49 allowed by the Queue Server's contract with the Framing Agent. Note that messages accepted by the Queue Server are additionally subjected to a maximum message length, which is also part of the SLA between the Queue Server and the Framing Agent or application. The Queue Server will reject messages which are too long, or which cannot be transmitted without violating the SLA.

Whenever the CT 43, subject to its constraints based on duty cycle or frequency of transmission or cost, is ready to begin transmission, the Broadcast Server 41 examines the end of the Queue 43. If a message is waiting, the Broadcast Server removes the message from the Queue, appends to it the current time, and passes it to the CT 43. The CT immediately begins transmitting the message by modulating the A2E Broadcast Medium 44.

The organization of the Message Queue is a modified FIFO (first-in-first-out). Most messages that enter the queue have no guaranteed delivery time and no Contractual Maximum Wait Time. Some message types have associated Contractual Wait Times and Priorities. Only the Contractual Wait Time of a Master Frame Announcement is actually guaranteed. When a message with a SLA arrives at the Message Queue, the Queue Server places the message as far back in the queue as possible, such that:

1. Its Contractual Wait Time is not violated, and
2. It is not placed so that the Contractual Wait Time of another waiting message of equal or higher priority is violated.

Each time a priority message is placed in the Message Queue, Queue Server must scan the entire Queue to determine if the placement needed to meet the message's Contractual Wait Time will cause the Contractual Wait Time of other messages in the queue to be violated. If it is determined that a violation will occur, the disposition of the new message is determined by a rule provided by the requestor (sender): the message can be discarded with a notification to the requestor, or the message can be placed in the best available position in the queue even though that position does not meet the Contract. In the latter case, the requestor is notified of the actual expected transmission time.

If the placement of a priority message in the queue will cause the violation of the contract on older messages of lower priority, the disposition rule associated with the affected messages can be reapplied. This may cause some messages to be removed from the queue, and will cause additional notifications to be sent to the affected requestors.

Normally, a message in the process of being transmitted is never displaced by the arrival of a new message, regardless of priority.

Master Frame Announcements are the highest priority message, and they are the only messages at that priority. Thus, under ordinary circumstances, a MFA cannot be displaced, and its Contractual Wait Time is an absolute guarantee as long as said Contractual Wait Time is longer than the time required for transmitting the longest allowed message, given only that the CT serves only a single source of MFAs.

Referring again to FIG. 2, the CT 24 can be sited at the electrical distribution substation 21, or at a remote broadcast point (not shown) serving multiple substations. In the former case, the Queue, the Queue Server, and the Broadcast Server all reside on the Server 23 at the substation. In the latter case, however, where the CT at a remote broadcast point serves multiple substations, a computer called the CT Server must be dedicated to the CT and host the Queue, a Remote Queue Server, and the Broadcast Server. The substation Server 23 hosts only a local Queue Server, which is in two-way high-speed communication via a conventional wide-area network or the Internet with the Remote Queue Server. The Local Queue Server offers the Broadcast Queue interface to the Framing Agent and the other applications, which are not required to behave differently because the CT is a shared resource.

When the CT is a shared resource, there are two possible arrangements regarding framing. In the first solution, all the Data. Collection Servers share the same Master Frame Cycle and Slot Size. One Data Collection Server is designated as the sole generator of the Master Frame Announcements, and only that Server hosts a Framing Agent.

In the second solution, the Data Collection Servers can have different Slot Sizes and Master Frame Cycles, but the Master Frame Sizes and Master Frame Origins are selected so that two or more Master Frame Announcements never arrive at the CT within one predefined interval, where said interval is equal to or greater than the Contractual Maximum Wait Time of the MFA for the Server with the shortest Contractual Maximum Wait Time. In this case, each Server at a Data Aggregation Point hosts its own Framing Agent. The identity of the Data Collection Server must be included in the MFA, to ensure that ICDs do not obey directives issued from a Server other than the one properly associated with said ICDs.

When a Master Frame Announcement reaches the front of the broadcast transmission queue and the previous message has been completely transmitted, then the starting transmission time of the MFA is exactly known by the Broadcast Server. At that point the Broadcast Server inserts the transmission start time into the MFA after the data provided by the originating Server. Based on the assumption that the transmission latency is the same at all receiving endpoints, the receiving endpoints can use the transmission start time in the message to eliminate any drift from their local clocks, and then reset their transmission schedules based on the upcoming future beginning of the new Master Frame. This ensures that the endpoints are synchronized to a tolerance based on the variation in latency introduced by the transmission medium employed by the broadcast CT.

This tolerance can be calculated or measured for a given broadcast transmission medium. Said tolerance determines the slot size with respect to the length of message packets transmitted in the slots by the ICDs. The closer the tolerance achieved, the higher the utilization achieved on the slotted channel.

Embodiment 2

Figure 3:
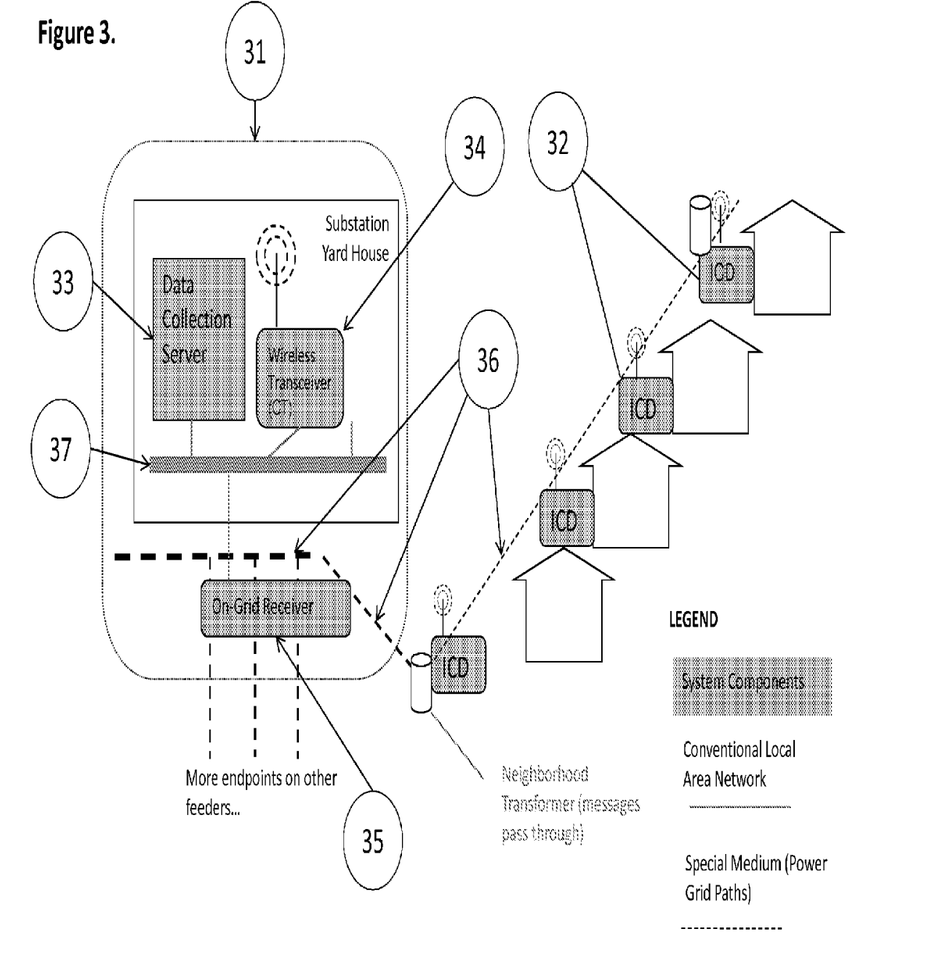
FIG. 3 illustrates a network where the transmission medium used by the ICDs is different than the data-bearing transmission medium used by the CT, where the CT's data-bearing medium is a conventional network with variable latency, and where the CT cannot initiate a transmission to an ICD.

In a second embodiment of the invention, no in-band broadcast channel is available, and a third-party network provider is substituted to simulate the in-band CT and receivers at the ICD. This embodiment is called a simulated broadcast embodiment. FIG. 3 illustrates an electrical distribution substation 31 from which originates an electrical distribution grid 36. The substation 31 contains a Server 33, a wireless transceiver acting as the CT 34, and a Receiver 35, The Server has conventional two-way network communication with the CT and Receiver via Local Area Network 37. The network medium for the slotted edge to aggregation point transmissions used by the ICDs is the electrical distribution grid 36, and the network medium for transmission from the aggregation point to the edge is any conventional network that supports TCP/IP or other two-way communications protocols, but typically is a wireless network such as the cellular cloud, represented in FIG. 3 by the presence of antennae on the ICDs 32 and CT 34. At or near the edge of the electrical distribution grid are attached at least one ICDs 32 enabled for wireless machine-to-machine communication. The ICDs contain a system clock, a processor, storage for programs and data, a transmitter capable of sending messages on the electrical distribution grid 36 to Receiver 35, and transceiver or modem capable of polling the Server 33 by means of CT 34 and receiving responses sent via CT 34. The network medium provides at least one edge to aggregation point (E2A) channel. A Simulated Broadcast Server program executing on the Server 33 may simulate the A2E channel in this embodiment. In this embodiment, other software stored and executing on the ICDs 22 poll the Server 33 on a regular, but infrequent, basis consistent with the constraints imposed by the wireless provider on machine-to-machine communications, which are well known in the art. The constraints center on the concept that the number of simultaneous polls from ICDs in a single zone of the wireless network must be a small number based on the capacity and traffic in the zone. One method of ensuring that the constraints are met involves assigning polling times to ICDs based on the geospatial location of the ICD. The ICDs are assigned designated A2E polling times with respect to the Master Frame Origin as well as E2A transmission slots when they are provisioned. All ICDs that share a Server must poll at the same frequency which is well-known to the Server.

In this second embodiment, the actual settings of the system clocks on the ICDs is accomplished using a capability of the wireless network or other out-of-band means unrelated to the A2E messaging protocol, because the latency associated with wireless and other low-cost networks using routed protocols such as TCP/IP is insufficiently consistent to be used for this purpose. Even TCP/IP application protocols such as NTP that are well known in the art and designed for the specific purpose of node synchronization have failed to achieve the desired synchronization tolerance required for the present invention. Specifically, the network providing the simulated broadcast medium must provide some mechanism for synchronization.

Some embodiments of the cellular communications network use a time-division multiplexing scheme similar to that employed by the E2A channels in the present invention, which also requires that cellular transmitters on endpoints (e.g. mobile phones) be time synchronized. This time synchronization is adequate to achieve the tolerances of the present invention if the design of the cellular receiver in the ICD does not introduce too much additional latency in exposing the network time to the software executing on the processor of the ICD.

An alternative is that a broadcast timing pulse may be employed. Several public and private RF architectures include the capability to broadcast a timing pulse detectable by a receiver in the ICD. When a timing pulse is employed, the Framing Agent pre-announces the time at which the next Master Frame begins, as before. A timing pulse is then broadcast upon the actual Master Frame Origin. In the case where the Server does not have the option to determine the time at which the pulse is broadcast, then the Framing Agent must pre-announce the actual system time of a future timing pulse, and a window of local clock times within which ICDs may expect the pulse to be detectable. The window is required to ensure that ICDs do not ignore a timing pulse or falsely synchronize on the wrong timing pulse because the local clock has drifted. Ideally, timing pulses will occur less frequently than the interval of time in which all ICDs are expected to have polled the Server exactly once.

The second embodiment requires a different method of managing the Broadcast Transmission Queue as compared to the first embodiment. Prioritizing the messages in the queue is not effective, because no ICD will receive any message until it polls, regardless of its priority. Nor can a message be removed from the queue when it is transmitted to an ICD as a polling response, because potentially every ICI) must obtain the message in order to simulate a broadcast CT.

As messages are placed in the Simulated Broadcast Transmission Queue, they are assigned a monotonically ascending sequence number. This sequence number semantically replaces the timestamp inserted in broadcast messages by the True Broadcast Server. A sequence number is similarly stored in a database inventory of all ICDs served by this CT, which represents the last sequence number assigned to any message the last time each ICD polled the Server for messages. When an ICD polls the Simulated Broadcast Server, the server responds by sending to the endpoint ALL messages in the Simulated Broadcast Queue whose sequence number is higher than the sequence number currently associated with the polling endpoint, then updates the sequence number in the inventory of endpoints entry for that ICD with the highest sequence number of any message in the newest response. The sequence number need not be transmitted to the endpoints, so it can be as large as needed without adding to the bandwidth burden of the constrained Simulated Broadcast Channel. The TCP/IP protocol will ensure that the messages arrive at the endpoint, though it will not ensure that it does so with a predictable latency. This scheme ensures that each endpoint receives each message only once.

In the Simulated Broadcast embodiment, inserting the central system time in the Master Frame Announcement is not useful because the latency between the Simulated Broadcast Server and the endpoint is not constant or predictable. Instead, Master Frame Announcements must be enqueued at least 2T prior to the time of the master frame origin, where T is the polling frequency of the endpoints.

Emergency Messages and Preemption.

In any embodiment of this invention, Master Frame Announcements are normally the highest-priority messages in the Broadcast Transmission Queue. However, in the case where the network substrate is the power grid, there exist rare events that endanger the power grid, such as an out-of-tolerance peak load or an equipment failure that is cascading. In such circumstances, extraordinary measures must be taken to protect the grid, even if the consequence is that endpoint synchronization is temporarily lost or the contract with the A2E network provider is violated. In these rare cases, the Broadcast Server is permitted to abort the message currently in transmission, if any, and to pre-empt even a Master Frame Announcement.

The Broadcast server minimizes the disruptive effect of emergency broadcasts by means of the algorithm used to re-normalize the queue after a pre-emption, as described below. It is unlikely that the preemption algorithm will be needed for radio-based solutions, but when the broadcast transmitter is a low bandwidth device such as an Audio Frequency Ripple Controller, then the preemption capability becomes necessary. When a Simulated Broadcast Server is employed, pre-emption may be simulated by sending SMS messages to the ICDs affected by the emergency conditions. Upon receipt of such a message, an ICD polls the Server immediately regardless of its place in the polling sequence.

Figure 5:
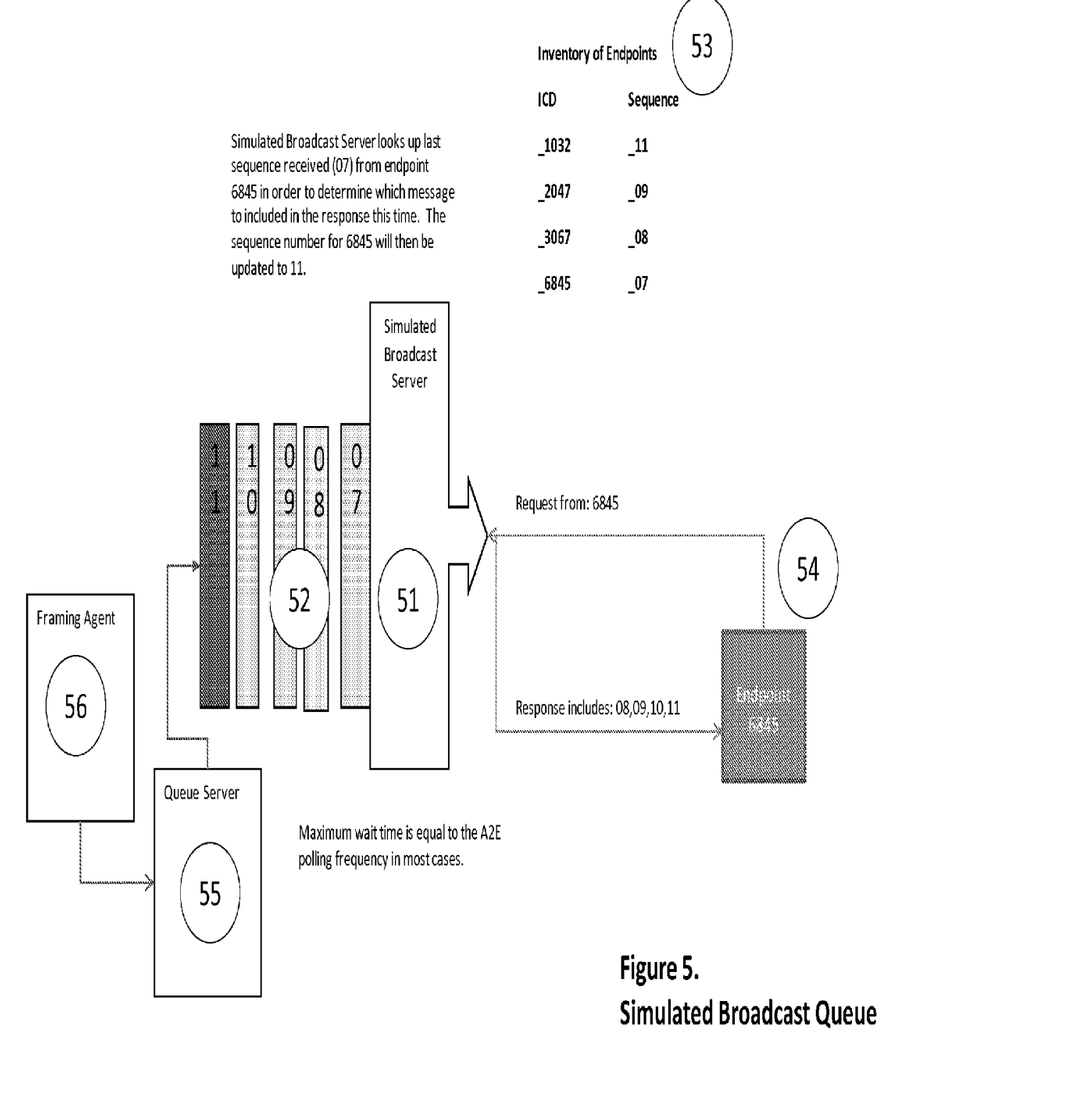
FIG. 5 illustrates the software model for the transmission queue of FIG. 3 with simulated broadcast.

FIG. 5 illustrates the Simulated Broadcast e. As in the previous embodiment, Framing Agent 56 places MFAs and potentially other messages, such as timing pulse identifications, into the Broadcast Queue 52 by means of Queue server 55. In this embodiment, Broadcast Queue 52 observes a simple FIFO discipline, except that messages are not removed from the queue until all ICDs in the Inventory of Endpoints 53 have a higher sequence number than the message. ICDs 54 poll Simulated Broadcast Server 51 at regular frequencies but staggered intervals. When Simulated Broadcast Server 51 detects a poll from an ICD, it looks up the sequence number last associated with that ICD, and responds by sending said ICD all messages in the Broadcast Queue 52 which have a higher sequence number than that associated with the polling ICD. The sequence number of the highest-sequenced message in the response is then associated with that ICD in the Inventory of Endpoints 53. The Simulated Broadcast Server then queries the Inventory of Endpoints to find the lowest sequence number associated with any ICD, and remove any messages from the Broadcast Queue whose sequence number is lower than that. It will be obvious to one ordinarily skilled in the art that the failure of some ICDs to poll on schedule could cause messages to be retained in the queue for a long period of time. It is therefore advisable to add to this method a method for detecting failed endpoints and excluding their sequence numbers from the query of the Inventory of Endpoints 53 used to determine the threshold sequence number for purging the Broadcast Queue.

Endpoint Clock Adjustments.

The ICDs employ stored policies and the information in the Master Frame Announcements to determine how ICDs utilize the multiplicity of channels so that each ICD will avoid transmitting when the transmission will collide with the transmission of another ICD.

Each ICD can transmit on a multiplicity of frequency-based channels on the power grid medium, but each ICD can only transmit on one frequency-based channel at a time. Further, each ICD transmitter has a duty cycle which requires it to be quiescent on all channels at regular intervals. The broadcast channel (received by endpoints) is both full-duplex and asynchronous with respect to the slotted channel, regardless of whether it is simulated or true broadcast.

For every slotted channel on which a particular ICD is permitted to transmit, the ICD stores a policy that determines in which slots within the Master Frame it is expected to transmit. No ICD has a need to know the slot assignments of any other ICD. The Server is responsible for provisioning the ICDs in such a way that (when properly synchronized) transmissions from no two ICDs ever collide on a slotted channel.

An ICD joining the network does not transmit at all until it has received a Master Frame Announcement. (This is another reason for transmitting the Master Frame Announcement more than once during a given Master Frame.) When an ICD receives an MFA, it performs two activities.

First, the ICD records the Master Frame Origin for the next cycle. The ICD does not distinguish between new and redundant MFAs. Any MFA received during the current Master Frame always is construed to pertain to the next Master Frame.

Second, an ICD which is the client of a true broadcast CT compares the transmit time in the MFA with the local clock time when the message was received to determine if there has been clock drift since the last MFA. If so, the endpoint computes the size and sign of the adjustment needed, and waits for the next quiescent transmitter interval. At that time, a smooth adjust technique (for example, as implemented by the Linux command "date—a") is used to rectify clock synchronization. When such an adjustment is made during the quiescent interval, the clock adjustment cannot interfere with the correct operation of the digital signal processing firmware, and the adjustment is complete in time to ensure that the next transmission is synchronized with the global slotting scheme.

An ICD that is the client of a simulated broadcast CT does not need to compute clock drift because it is able to use the A2E network time or pulse to keep its clock synchronized.

An ICD that has not received any Master Frame Announcement for the next Master Frame by the end of the current master frame stops transmitting until it receives another MFA. This prevents the unsynchronized ICD from colliding with the transmissions of other endpoints. Because of redundant MFA transmissions, it is unlikely that any ICD would fail to receive all MFAs in an entire frame unless its receiver has malfunctioned.

Other Embodiments

This description of the preferred embodiments of the invention is for illustration as a reference model and is not exhaustive or limited to the disclosed forms, many modifications and variations being apparent to one of ordinary skill in the art.

What is claimed is:

1. A queue server comprising:
a memory configured to maintain a message queue; and
a processor device communicatively coupled to the memory and configured to:
receive, from a master framing agent, a master frame announcement (MFA) that identifies a future time of a corresponding master frame, the corresponding master frame comprising a plurality of time slots, each time slot associated with a particular intelligent communicating device (ICD) of a plurality of ICDs that are coupled to an electrical distribution grid on a low voltage side of a transformer;
insert the MFA into the message queue;
determine that a transmitter coupled to the electrical distribution grid on a high voltage side of the transformer is ready to transmit;
retrieve the MFA from the message queue;
insert a current time into the MFA; and
provide the MFA to the transmitter for transmission onto the electrical distribution grid.

2. The queue server of claim 1 wherein the processor device is further configured to insert the MFA at a front of the message queue in front of a plurality of other messages in the message queue.

3. The queue server of claim 1 wherein the processor device is further configured to iteratively provide a plurality of MFAs to the transmitter for transmission onto the electrical distribution grid at arbitrary times.

4. A method comprising:
receiving, by a queue server comprising a processor device from a master framing agent, a master frame announcement (MFA) that identifies a future time of a corresponding master frame, the corresponding master frame comprising a plurality of time slots, each time slot associated with a particular intelligent communicating device (ICD) of a plurality of ICDs that are coupled to an electrical distribution grid on a low voltage side of a transformer;
inserting the MFA into a message queue;
determining that a transmitter coupled to the electrical distribution grid on a high voltage side of the transformer is ready to transmit;
retrieving the MFA from the message queue;
inserting a current time into the MFA; and
providing the MFA to the transmitter for transmission onto the electrical distribution grid.

5. The method of claim 4 further comprising inserting the MFA at a front of the message queue in front of a plurality of other messages in the message queue.

6. The method of claim 4 further comprising iteratively providing a plurality of MFAs to the transmitter for transmission onto the electrical distribution grid at arbitrary times.

7. An intelligent communicating device (ICD) comprising:
a communications interface configured to be coupled to an electrical distribution grid on a low voltage side of a transformer;
a clock; and
a processor device communicatively coupled to the communications interface and the clock, and configured to:
receive a respective master frame announcement (MFA) of a plurality of MFAs transmitted at arbitrary times through the transformer by a transmitter coupled to the electrical distribution grid on a high voltage side of the transformer, each MFA identifying a time of transmission of the respective MFA and a future time of a corresponding master frame, the corresponding master frame comprising a plurality of time slots, each time slot associated with a particular ICD of a plurality of ICDs;
based on the time of transmission of the respective MFA and the future time of the corresponding master frame, synchronize the clock;
await the future time of the corresponding master frame; and
transmit data on the electrical distribution grid to the high voltage side of the transformer in a time slot of the corresponding master frame that is associated with the ICD.

8. The intelligent communicating device of claim 7 wherein the processor device is further configured to access a policy that identifies the time slot of the corresponding master frame that is associated with the ICD.

9. A method comprising:
receiving, by an intelligent communicating device (ICD) coupled to an electrical distribution grid on a low voltage side of a transformer, a respective master frame announcement (MFA) of a plurality of MFAs transmitted at arbitrary times through the transformer by a transmitter coupled to the electrical distribution grid on a high voltage side of the transformer, each MFA identifying a time of transmission of the respective MFA and a future time of a corresponding master frame, the corresponding master frame comprising a plurality of time slots, each time slot associated with a particular ICD of a plurality of ICDs;
based on the time of transmission of the respective MFA and the future time of the corresponding master frame, synchronizing a clock of the ICD;
awaiting the future time of the corresponding master frame; and
transmitting data on the electrical distribution grid to the high voltage side of the transformer in a time slot of the corresponding master frame that is associated with the ICD.

10. The method of claim 9 further comprising accessing a policy that identifies the time slot of the corresponding master frame that is associated with the ICD.

11. A queue server comprising:
a communications interface configured to communicate via a data communications network; and
a processor device configured to:
maintain a queue of messages, at least one of the messages comprising a master frame announcement (MFA) that identifies a future time of a corresponding master frame, the corresponding master frame comprising a plurality of time slots associated with communications via an electrical distribution grid, each time slot associated with a particular ICD of a plurality of ICDs coupled to the electrical distribution grid located on a low voltage side of a transformer;
receive a request from a first ICD of the plurality of ICDs via the data communications network; and
in response to the request, send, via the data communications network, a subset of messages in the queue of messages, the subset of messages including the MFA, to the first ICD.

12. The queue server of claim 11 wherein each message in the queue of messages includes a unique sequence number, and wherein the processor device is further configured to:
maintain, for each respective ICD of the plurality of ICDs, a corresponding unique sequence number that identifies a largest sequence number of any message previously sent to the respective ICD; and
wherein to send the subset of messages to the first ICD the processor device is further configured to:
access the corresponding unique sequence number that identifies a largest sequence number of any message previously sent to the first ICD;
send to the first ICD each message in the queue of messages having a unique sequence number that is greater than the largest sequence number of any message previously sent to the first ICD;
determine the largest sequence number of any message sent to the first ICD; and
store the largest sequence number as the corresponding unique sequence number that identifies the largest sequence number of any message previously sent to the first ICD.

13. A method comprising:
maintaining, by a queue server comprising a processor device, a queue of messages, at least one of the messages comprising a master frame announcement (MFA) that identifies a future time of a corresponding master frame, the corresponding master frame comprising a plurality of time slots associated with communications via an electrical distribution grid, each time slot associated with a particular ICD of a plurality of ICDs coupled to the electrical distribution grid located on a low voltage side of a transformer;

receiving a request from a first ICD of the plurality of ICDs via a data communications network, the data communications network being different from the electrical distribution grid; and in response to the request, sending, via the data communications network, a subset of messages in the queue of messages, the subset of messages including the MFA, to the first ICD.

14. The method of claim 13 wherein each message in the queue of messages includes a unique sequence number, and further comprising:

maintaining, for each respective ICD of the plurality of ICDs, a corresponding unique sequence number that identifies a largest sequence number of any message previously sent to the respective ICD; and wherein sending the subset of messages to the first ICD further comprises:

accessing the corresponding unique sequence number that identifies the largest sequence number of any message previously sent to the first ICD;

sending to the first ICD each message in the queue of messages having a unique sequence number that is greater than the largest sequence number of any message previously sent to the first ICD;

determining the largest sequence number of any message sent to the first ICD; and storing the largest sequence number as the corresponding unique sequence number that identifies the largest sequence number of any message previously sent to the first ICD.

* * * * *